United States Patent
Archambault et al.

(10) Patent No.: US 7,506,331 B2
(45) Date of Patent: Mar. 17, 2009

(54) METHOD AND APPARATUS FOR DETERMINING THE PROFITABILITY OF EXPANDING UNPIPELINED INSTRUCTIONS

(75) Inventors: Roch Georges Archambault, North York (CA); Robert Frederick Enenkel, Markham (CA); Robert William Hay, Toronto (CA); Allan Russell Martin, Toronto (CA); James Lawrence McInnes, Toronto (CA); Ronald Ian McIntosh, Toronto (CA); Mark Peter Mendell, Toronto (CA)

(73) Assignee: International Business Machines Corporation, Armonk, NY (US)

(*) Notice: Subject to any disclaimer, the term of this patent is extended or adjusted under 35 U.S.C. 154(b) by 901 days.

(21) Appl. No.: 10/930,042

(22) Filed: Aug. 30, 2004

(65) Prior Publication Data

US 2006/0048111 A1 Mar. 2, 2006

(51) Int. Cl.
*G06F 9/45* (2006.01)
(52) U.S. Cl. .............. 717/160; 717/151; 717/156; 717/161
(58) Field of Classification Search ......... 717/124–130, 717/151–161
See application file for complete search history.

(56) References Cited

U.S. PATENT DOCUMENTS

| | | | | |
|---|---|---|---|---|
| 5,491,823 A | * | 2/1996 | Ruttenberg | ............ 717/161 |
| 5,850,552 A | * | 12/1998 | Odani et al. | ............ 717/156 |
| 5,875,316 A | * | 2/1999 | Panwar et al. | ............ 712/215 |
| 6,321,380 B1 | | 11/2001 | Derrick et al. | ............ 717/11 |
| 6,631,463 B1 | | 10/2003 | Floyd et al. | ............ 712/227 |
| 6,738,893 B1 | * | 5/2004 | Rozas | ............ 712/24 |
| 7,134,120 B2 | * | 11/2006 | Hammes | ............ 717/155 |

OTHER PUBLICATIONS

Bhagwati et al., "Automatic Verfication of Pipelined Microprocessors", 31st ACM/IEEE Design Automation Conference, 1994, pp. 603-608.

Lam, "Software Pipelining: An Effective Scheduling Technique for VLIW Machines", 1988 ACM, Proceedings of the SIGPLAN '88, Conference on Programming Language Design and Implementation, Atlanta, GA, Jun. 22-24, 1988, pp. 318-328.

Proceedings of the ACM SIGPLAN '92 Conference on Programming Language Design and Implementation, San Francisco, CA, Jun. 1992, SIGPLAN Notices, vol. 27, No. 7, pp. 322-330.

Llosa et al., "Lifetime-Sensitive Modulo Scheduling in a Production Environment", IEEE Transactions on Computers, vol. 50, No. 3, Mar. 2001, pp. 234-249.

* cited by examiner

*Primary Examiner*—Lewis A. Bullock, Jr.
*Assistant Examiner*—Jason Mitchell
(74) *Attorney, Agent, or Firm*—Yee & Associates, P.C.; Libby Z. Handelsman

(57) ABSTRACT

A method, apparatus, and computer instructions for processing instructions. A data dependency graph is built. The data dependency graph is analyzed for recurrences, and unpipelined instructions that lie outside of the recurrences are expanded.

4 Claims, 3 Drawing Sheets

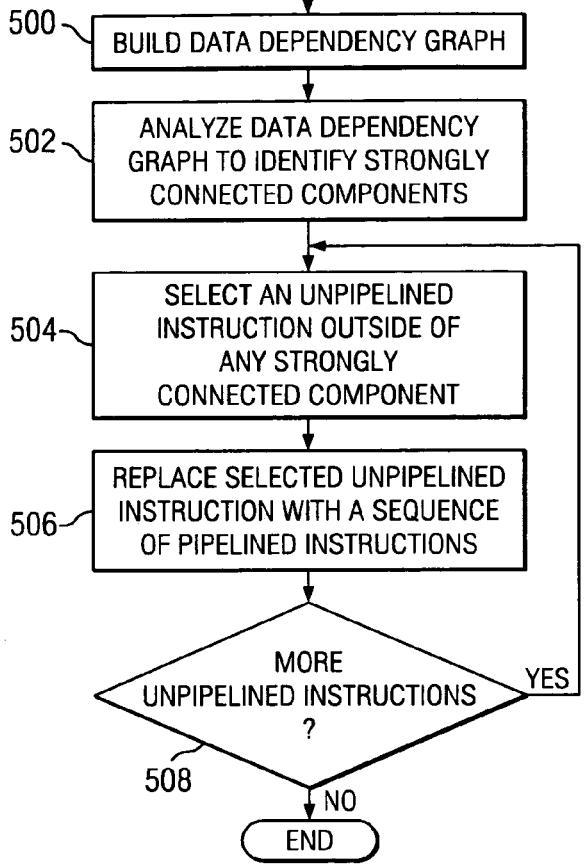

FIG. 5

- 500 BUILD DATA DEPENDENCY GRAPH
- 502 ANALYZE DATA DEPENDENCY GRAPH TO IDENTIFY STRONGLY CONNECTED COMPONENTS
- 504 SELECT AN UNPIPELINED INSTRUCTION OUTSIDE OF ANY STRONGLY CONNECTED COMPONENT
- 506 REPLACE SELECTED UNPIPELINED INSTRUCTION WITH A SEQUENCE OF PIPELINED INSTRUCTIONS
- 508 MORE UNPIPELINED INSTRUCTIONS?

FIG. 7 — 700

```
LABEL:
Load    r1 = input_address
Func    r2 = r1
Store   output_address = r2
Branch  LABEL
```

FIG. 8 — 800

```
802  (Prologue)
     Load    r1 = input_address
     Func    r2 = r1

804  LABEL:
     Load    r1 = input_address
     Store   output_address = r2
     Func    r2 = r1  ~808
     Branch  LABEL 806  (Epilogue)
     Store   output_address = r2
```

FIG. 9 — 900

```
LABEL
Load    r1 = input_address
Rep1    r2 = r1  ~902
Rep2    r3 = r2  ~904
Rep3    r4 = r3  ~906
Rep4    r5 = r4  ~908
Rep5    r6 = r5  ~910
Rep6    r7 = r6  ~912
Rep7    r8 = r7  ~914
Store   output_address = r8
Branch  LABEL
```

FIG. 10 — 1000

```
(Prologue)
Load    r1 = input_address
Rep1    r2 = r1
Rep2    r3 = r2
Rep3    r4 = r3
Rep4    r5 = r4

LABEL:
Load    r1 = input_address
Rep5    r6 = r5
Rep1    r2 = r1
Rep6    r7 = r6
Rep2    r3 = r2
Rep7    r8 = r7
Rep3    r4 = r3
Store   output_address = r8
Rep4    r5 = r4
Branch  LABEL (Epilogue)
Rep5    r6 = r5
Rep6    r7 = r6
Rep7    r8 = r7
Store   output_address = r8
```

METHOD AND APPARATUS FOR DETERMINING THE PROFITABILITY OF EXPANDING UNPIPELINED INSTRUCTIONS

BACKGROUND OF THE INVENTION

1. Technical Field

The present invention relates generally to an improved data processing system and in particular to a method and apparatus for processing data. Still more particularly, the present invention relates to a method, apparatus, and computer instructions for optimizing execution of instructions.

2. Description of Related Art

Modern computer processors are often able to process many instructions simultaneously, a property known as being superscalar. One method in which processors achieve this property is by pipelining the execution of instructions. In this process, machine instructions are processed in a series of stages that each do some part of the processing, much like an assembly line. The effect of pipelining instructions is that successive instructions can be started down the pipeline before previous instructions are completed.

However, many modern computer processors are not able to pipeline very expensive machine instructions that require more complex circuitry. On many processors, these expensive instructions typically are handled as special cases, which tie up machine resources for many cycles without allowing other instructions to be processed.

In most cases, the mathematical functions performed by these unpipelined instructions can be calculated or approximated using an expanded sequence of simple, pipelined mathematical instructions. For example, the floating point square root instruction can be calculated using the Newton Iteration method, which can commonly be implemented with simpler pipelined floating point operations. Other examples of commonly unpipelined hardware instructions that have pipelined replacement sequences are floating point divide, floating point reciprocal square root, and floating point sin.

In most cases, the unpipelined instruction will have a shorter latency to dependent instructions than an expanded sequence of pipelined instructions. If this was not the case, then the unpipelined instruction would not provide any value, since the expanded sequence of instructions would always be an improvement. Thus, the unpipelined instruction is a good choice when no other instructions can be executed in parallel. However, in cases where other operations can be executed in parallel with the operation, it is profitable to expand the unpipelined instruction into the expanded sequence of pipelined instructions.

If unpipelined instructions are expanded everywhere in a program by an optimizing compiler, then it will benefit the program execution performance in cases where there was code to execute in parallel with the operation, and it will harm the performance in cases where there was no code to execute in parallel. The fundamental difficulty in generating the pipelined expanded sequences in an optimizing compiler is determining when the expansion of unpipelined instructions is profitable.

Therefore, it would be advantageous to have an improved, apparatus, and computer instructions for determining the profitability of expanding unpipelined instructions in code.

SUMMARY OF THE INVENTION

The present invention provides a method, apparatus, and computer instructions for processing instructions. A data dependency graph is built. The data dependency graph is analyzed for strongly connected components, and unpipelined instructions that lie outside of the strongly connected components are expanded.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for expanding unpipelined instructions in accordance with a preferred embodiment of the present invention;

FIG. 7 is a diagram of code for a loop in accordance with a preferred embodiment of the present invention;

FIG. 8 is a diagram illustrating a second version of a loop in accordance with a preferred embodiment of the present invention;

FIG. 9 is a diagram illustrating a sequence of replacement pipelined instructions for an unpipelined instruction in a loop in accordance with a preferred embodiment of the present invention; and FIG. 10 is a diagram illustrating pipelining of instructions from the code illustrated in FIG. 9 in accordance with a preferred embodiment of the present invention.

DETAILED DESCRIPTION OF THE PREFERRED EMBODIMENT

Figure 1:
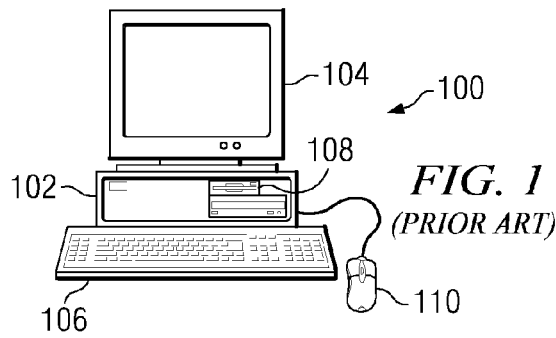
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
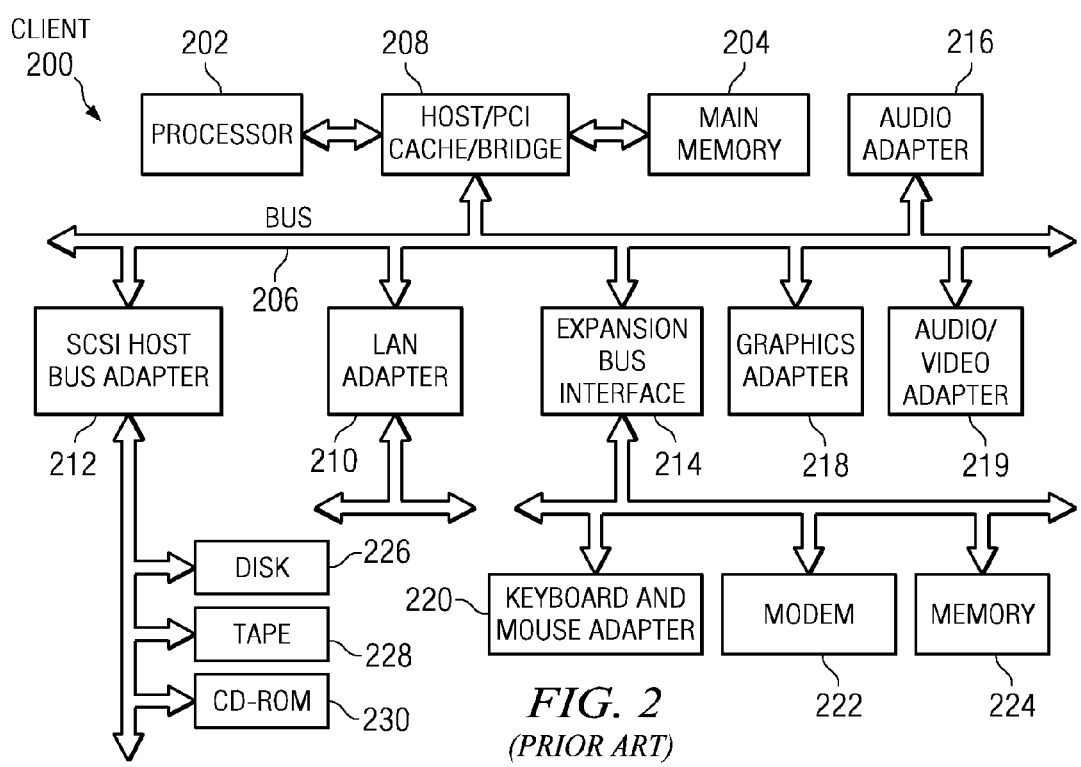
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
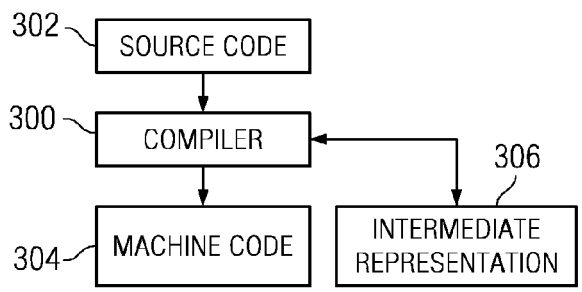
FIG. 3 is a diagram of components used in compiling software in accordance with a preferred embodiment of the present invention.

Turning next to FIG. 3, a diagram of components used in compiling software is depicted in accordance with a preferred embodiment of the present invention. Compiler 300 is software that converts a set of high-level language statements into a lower-level representation. In this example, the higher-level statements are present in source code 302. Source code 302 is written in a high-level programming language, such as, for example, C and C++. Source code 302 is converted into machine code 304 by compiler 300.

In the process of generating machine code 304 from source code 302, compiler 300 creates intermediate representation 306 from source code 302. Intermediate representation 306 code is processed by compiler 300 during which optimizations to the software may be made. After the optimizations have occurred, machine code 304 is generated from intermediate representation 306.

Figure 4:
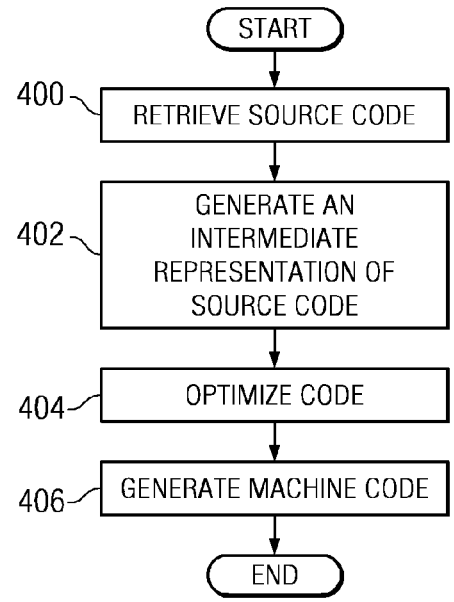
FIG. 4 is a flowchart of a process for generating code in accordance with a preferred embodiment of the present invention.

Turning now to FIG. 4, a flowchart of a process for generating code is depicted in accordance with a preferred embodiment of the present invention. The process illustrated in FIG. 4 may be implemented in a compiler, such as compiler 300 in FIG. 3.

The process begins by receiving source code (step 400). An intermediate representation of the source code is generated (step 402). Optimizations of the intermediate representation of the source code are performed (step 404). These optimizations may include, for example, optimizing scheduling of the execution of instructions. Machine code is then generated (step 406) with the process terminating thereafter.

In optimizing code, the compiler typically builds a data dependency graph (DDG). This type of graph is a data structure that is typically used in compilers for performing various optimizations. Nodes in this type of graph represents instructions for the code. Data dependencies between instructions are edges or bars that connect the nodes. Thus instructions scheduling optimizations make use of this type of graph. More information on data dependency graphs and optimizations may be found in Llosa et al., *Lifetime-Sensitive Modulo Scheduling in a Production Environment*, IEEE Transactions On Computers, volume 50, number 3, March 2001, pages 234-249. The present invention provides an improved method, apparatus, and computer instructions for determining the profitability of expanding unpipelined instructions.

Software pipelining is a compiler optimization technique for reordering the hardware instructions within a given loop in a computer program being compiled. This reordering is performed to minimize the number of cycles required for each iteration of the loop. Specifically, software pipelining seeks to optimize execution of code by overlapping the execution of different iterations of the loop to thereby achieve instruction level parallelism (ILP).

The mechanism of the present invention relates to computer processor architectures that include machine instructions that are not pipelined, but have a replacement sequence of pipelined instructions. In other words, an unpipelined instruction may be associated with a sequence of pipelined instructions that may be used to replace the unpipelined instruction to perform the same function or action.

The mechanism of the present invention determines the profitability of expanding unpipelined instructions into sequence of pipelined instructions within a compiler. In these illustrative examples, the mechanism of the present invention is applied to loop within the code. These types of structures and code are typically the most significant for improving overall program performance. The mechanism of the present invention determines the profitability of performing this type of expansion just before software pipelining. A data dependency graph is built and analyzed to identify strongly connected components. Strongly connected components are instructions that have cyclic data dependencies. These components also are referred to as recurrences. A cyclic data dependency is in which a direct data dependency in a data dependency graph goes forward and backward. For example, with nodes a and b, if a dependency from a to b is present as well as a dependency from b to a is present, a cyclic dependency occurs with respect to these two nodes.

Unpipelined instructions that lie outside of strongly connected components are expanded while unpipelined instructions that are within strongly connected components remain unexpanded. As a result, the mechanism of the present invention provides a benefit of generating expanded sequences of pipelined instructions only in situations in which there most likely to be software pipelined. Such a feature is especially advantageous with respect to loops because instruction level parallelism occurs due to the overlapping of loop iterations.

Instruction level parallelism is a measure of how many operations in code that may be dealt with at once. The goal of a compiler and processor designers is to identify and take advantage of as much instruction level parallelism as possible. In other words, instruction level parallelism involves executing multiple instructions at the same time.

Turning now to FIG. 5, a flowchart of a process for expanding unpipelined instructions is depicted in accordance with the preferred embodiment of the present invention. The process illustrated in FIG. 5 may be implemented in a compiler, such as compiler 300 in FIG. 3. In particular, this process may be initiated late in the optimizing of code in step 404 in FIG. 4. For example, this process may be performed as a last type or late scheduling of code during optimization right before the generation of machine code.

The process begins by building a data dependency graph for the code being optimized (step 500). Thereafter, the data dependency graph is analyzed to identify strongly connected components that may be present in the code (step 502). An unpipelined instruction outside of any strongly connected component is selected (step 504). This unpipelined instruction of these examples is one that has a replacement sequence of pipelined instructions. The selected unpipelined instruction is replaced with the sequence of pipelined instructions (step 506).

Next, a determination is made as to whether more unpipelined instructions are outside of any strongly connected component and being associated with a sequence of pipelined instructions is present (step 508). If additional instructions of this type are present, the process returns to step 504. Otherwise, the process terminates.

Figure 6:
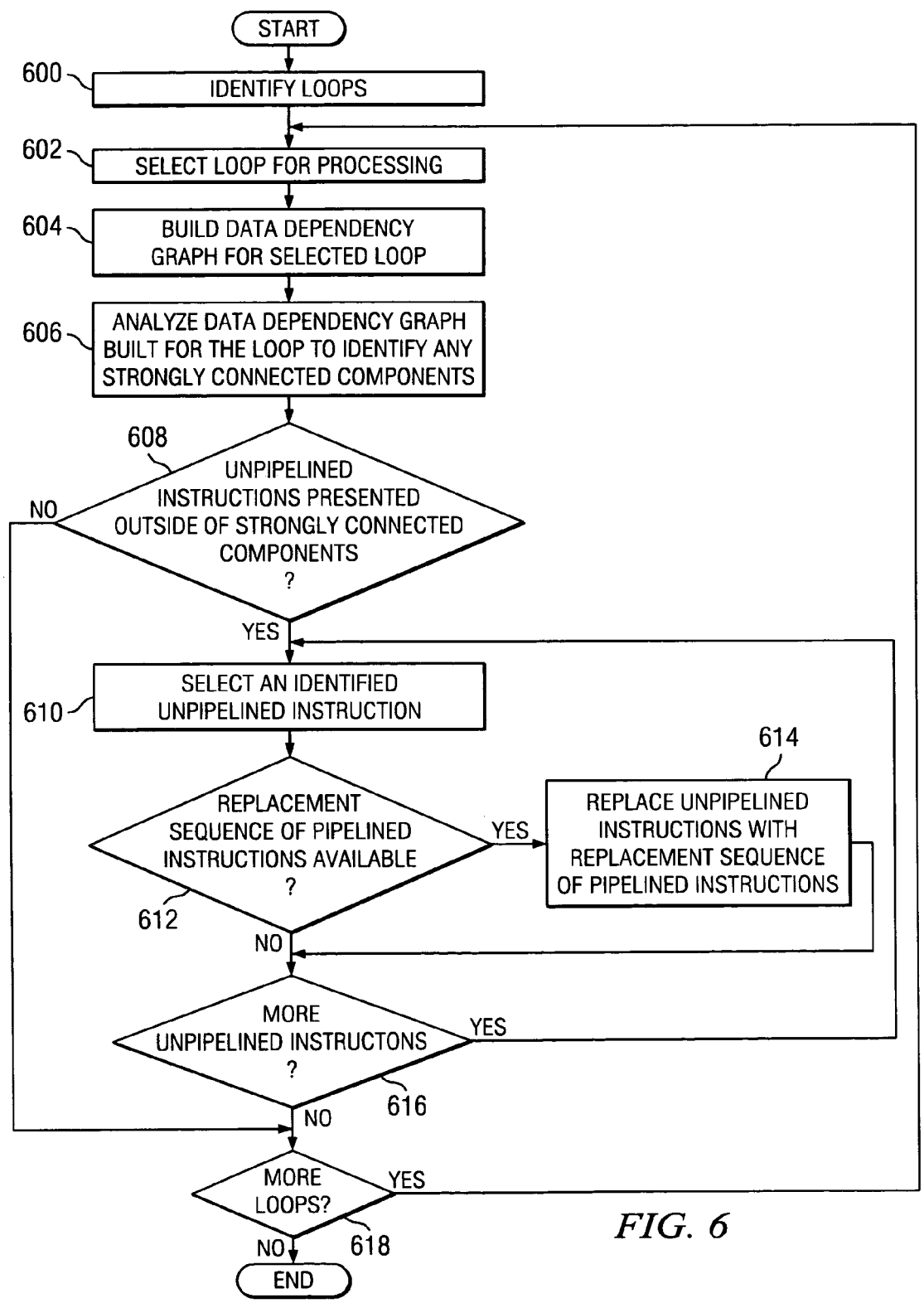
FIG. 6 is a flowchart of a process for optimizing loops and code to take advantage of instruction level parallelism in accordance with a preferred embodiment of the present invention.

The mechanism of the present invention may be applied to any type of structure in the code. This mechanism, however, is especially useful with respect to loops in which overlapping loop iterations may occur during instruction level parallelism. Turning next to FIG. 6, a flowchart of a process for optimizing loops and code to take advantage of instruction level parallelism is depicted in accordance with a preferred embodiment of the present invention. The process in FIG. 6 may be implemented in a compiler, such as compiler 300 in FIG. 3. This process is a more detailed example of the type of code structure that may be handled through the general process illustrated in FIG. 5.

The process begins by identifying loops in the code (step 600). Next, a loop is selected for processing (step 602). A data dependency graph is built for the selected loop (step 604). Next, the data dependency graph built for the loop is analyzed to identify any strongly connected components (step 606). The strongly connected components are also referred to as recurrences in these examples and are nodes or instructions that have cyclic dependencies with each other.

Thereafter, a determination is made as to whether unpipelined instructions are present outside of the strongly connected components (step 608). If unpipelined instructions are present outside of the strongly connected components, an identified unpipelined instruction is selected for processing (step 610). A determination is made as to whether a replacement sequence of pipelined instructions is available for the unpipelined instruction identified in step 610 (step 612).

In these examples, the unpipelined instruction may be looked up within a table to determine whether a set or sequence of pipelined instructions are present to replace this unpipelined instruction. If a replacement sequence of pipelined instructions is available, the unpipelined instruction is replaced with the replacement sequence of pipelined instructions (step 614).

Next, a determination is made as to whether more unpipelined instructions are present for processing (step 616). If more unpipelined instructions are present, the process returns to step 610. Otherwise, a determination is made as to whether additional loops are present in the code for processing (step 618). If additional loops are present, the process returns to step 602. Otherwise, the process terminates.

With reference again to step 612, if a replacement sequence of pipelined instructions is unavailable, the process proceeds to step 616 as described above. Turning back to step 608, if unpipelined instructions are not present outside of the strongly connected components for this loop, the process proceeds to step 618 as described above. In this situation, the loop cannot be optimized by replacing unpiplined instructions with pipelined instructions. As a result, the process returns to see if additional loops are present for processing.

The order in which the steps for identifying and selecting loops for processing are presented for purposes of illustration and are not meant to limit the way in which loops may be processed when selected as a particular type of structure and the code for expansion. For example, rather than selecting each loop one at a time, a data dependency graph may be built for all the loops at once.

Once the data dependency graph is analyzed to determine all strongly connected components, any unpipelined instructions that are not found to be within a strongly connected component or recurrence are good candidates for expansion because the replacement sequence of pipelined instructions will be able to be software pipelined across multiple iterations of the loop. The unpipelined instructions that do lie within recurrences are not good candidates for expansion in these examples because their replacement sequences lengthen the latency around the strongly connected component and cause the execution of the loop to be slower than with unpipelined instructions. In this manner, the mechanism of the present invention selects unpipelined instructions that lie within loops, but that are not contained in a strongly connected component. These types of instructions are replaced with an appropriate expansion of a sequence of pipelined instructions. Thereafter, the data dependency graph may be updated or rebuilt and the resulting loop can be further optimized. These further optimizations may include software pipelining and/or instruction scheduling.

As can be seen, this mechanism for determining the profitability of expanding unpipelined instructions is relatively inexpensive in terms of compiler time. The low use of compiler time is present because only an extra expense for rebuilding and updating the data dependency graph for loops in which unpipelined instructions are expanded. Due to the fact that these loops are likely to be only a small fraction of the total code in a program, the cost of this type of processing with loops is negligible.

Turning next to FIG. 7, a diagram of code for a loop is depicted in accordance with a preferred embodiment of the present invention. In this illustrative example, code 700 is a loop that computes arithmetic function called 'Func' in an unpipelined instruction. This instruction competes for each element in an input array and stores the results to output array.

Now consider a machine that executes 1 pipelined instruction per cycle, and all delays between dependent instructions are 2 cycles (issue to issue), except that the unpipelined instruction 'Func' takes 10 execution cycles in which no other instructions can execute, and a dependent operation can issue 12 cycles after a 'Func' instruction has issued. Also consider that the Branch instruction terminating the loop does not cost any machine resources or cyles.

Now consider 2 versions of this loop. In version 1 of the loop, the Load and Store instructions are two addresses of memory locations that may overlap or be in the same location, such that is it not safe to move a Load instruction from a successive loop iteration before a Store instruction from a previous loop iteration.

Thus the instructions in this loop form a strongly connected component, because a dependence from the Load to the Func, a dependence from the Func to the Store, and a dependence from the Store to the Load (so that they are not reordered) is present. In this version of the loop, no software pipelining of instructions can be achieved because pipelining requires that Loads and Stores are moved past each other. Without software pipelining, one iteration of the loop executes with the Load issuing in cycle 0, the Func in cycle 2, and the Store in cycle 14. Thus, this loop is likely to take 15 cycles to execute each iteration (assuming the load from iteration 2 issues in cycle 15).

In the second version of this loop, it is known that the Load and Store instructions use memory addresses that are disjoint of each other. Thus, it is safe to move Loads and Stores past each other. If software pipelining is performed, then the execution of this loop may be reduced to 12 cycles per iteration by overlapping instructions from multiple loop iterations. As a result, the loop now has a prologue, a fast-running kernel, and an epilogue.

Turning next to FIG. 8, a diagram illustrating a second version of a loop is depicted in accordance with a preferred embodiment of the present invention. Code 800 is an example of a second version of loop 700 in FIG. 7. In this example, code 800 includes three sections: prologue 802, fast-running kernel 804, and epilogue 806.

In this example, the instructions in the loop kernel execute with the Load issuing in cycle 0, the Store issuing in cycle 1, and the Func issuing in cycle 2. The Load from the next iteration of the kernel can issue in cycle 12, so the loop kernel executes in 12 cycles per iteration.

Now consider that the operation 'Func' has a replacement sequence of 7 pipelined instructions, called 'Rep1, Rep2, Rep3, Rep4, Rep5, Rep6, and Rep7'. Turning next to FIG. 9, a diagram illustrating a sequence of replacement pipelined instructions for an unpipelined instruction in a loop is depicted in accordance with a preferred embodiment of the present invention. Code 900 illustrates a replacement of unpipelined instruction 808 in fast-running kernel 804 with a replacement sequence of instructions.

In this example, unpipelined instruction 808 is replaced with seven pipelined instructions: instructions 902, 904, 906, 908, 910, 912, and 914. Code 900 is an example of loop 800 after the replacement of unpipelined instruction 808 with a sequence of pipelined instructions.

In the version of this loop where the Load and Store instructions may reference the same memory locations, again no software pipelining can be performed. The loop executes with the Load issuing in cycle 0, the dependent instructions 902, 904, 906, 908, 910, 912, and 914 in cycles 2, 4, 6, 8, 10, 12, 14, and the Store in cycle 16. Thus, it takes 17 cycles per iteration to execute the instructions.

However, in the version of the loop with disjoint memory locations, software pipelining can be performed and the loop may execute in 9 cycles.

Turning next to FIG. 10, a diagram illustrating pipelining of instructions from the code illustrated in FIG. 9 is depicted in accordance with a preferred embodiment of the present invention. Code 1000 is an example of dual replacement of function instructions, such as unpipelined instruction 808 in code 800 in FIG. 8 with a sequence of replacement instructions. With this type of replacement, software pipelining may be performed and the loop may execute in 9 cycles as illustrated in code 1000. The loop kernel now executes in 9 cycles, with Load in cycle 0, Rep5 in cycle 1, and so on.

Thus it can be seen that when the unpipelined instruction is located within a strongly connected component, the execution of the loop is faster when the operation is not replaced with the sequence of pipelined instructions. This result occurs because the unpipelined instruction has a shorter latency to dependent instructions. However, then the unpipelined instruction is not located within a strongly connected component, then it is possible to perform significant software pipelining on the loop, and it is advantageous to generate the replacement sequence.

Thus, the present invention provides an improved method, apparatus, and computer instructions for determining the profitability of expanding unpipelined instructions into pipelined instructions. The mechanism of the present invention as described above identifies instructions located outside of a strongly connected component or recurrence. These types of unpipelined instructions may be replaced with sequences of pipelined instructions. This type of replacement is especially useful with respect to code structures, such as loops. In the case of loops, instruction level parallelism is achieved through the execution of different iterations of the loop in parallel or at the same time.

The benefit of the mechanism of the present invention comes with very little additional compile time cost, and provides a significant benefit in execution speed of these instructions inside loops.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing instructions, the method comprising:
   building a data dependency graph for a loop, wherein the loop comprises overlapping iterations;
   analyzing the data dependency graph to identify recurrences, wherein recurrences are instructions that have cyclic data dependencies;
   expanding each unpipelined instruction that lies outside of the recurrences, wherein a sequence of pipelined instructions is formed and associated with the each unpipelined instruction and wherein unpipelined instructions that lie inside the recurrences remain unexpanded;
   selecting an unpipelined instruction to form a first selected unpipelined instruction;
   referencing a table to determine whether the first selected unpipelined instruction is associated with the sequence of pipelined instructions;
   responsive to determining that the first selected unpipelined instruction is associated with a sequence of pipelined instructions, replacing the first selected unpipelined instruction with the sequence of pipelined instructions;
   referencing a table to determine whether a second unpipelined instruction lies outside the recurrences; and
   responsive to determining that a second unpipelined instruction exists, selecting the second unpipelined instruction, to form a second selected unpipelined instruction;
   determining whether the second selected unpipelined instruction is associated with the sequence of pipelined instructions; and
   responsive to determining that the second selected unpipelined instruction is associated with a second sequence of pipelined instructions, replacing the second selected unpipelined instruction with the sequence of pipelined instructions.

2. The method of claim 1, wherein the instructions are in the loop and wherein execution of different iterations of the loop in the instructions is optimized.

3. The method of claim 1, wherein the building step, the analyzing step and the expanding step are performed in a compiler.

4. The method of claim 2, wherein a number of cycles needed for each iteration of a loop is minimized.

* * * * *